A. H. SCHAFFERT.
ADJUSTABLE UNIT SHELVING.
APPLICATION FILED JULY 10, 1914.

1,126,094. Patented Jan. 26, 1915.
6 SHEETS—SHEET 1.

Witnesses

Inventor
ADOLF H. SCHAFFERT
By
Attorneys

A. H. SCHAFFERT.
ADJUSTABLE UNIT SHELVING.
APPLICATION FILED JULY 10, 1914.

1,126,094.

Patented Jan. 26, 1915.
6 SHEETS—SHEET 2.

Witnesses

Inventor
ADOLF H. SCHAFFERT
By
Attorneys

A. H. SCHAFFERT.
ADJUSTABLE UNIT SHELVING.
APPLICATION FILED JULY 10, 1914.

1,126,094.

Patented Jan. 26, 1915.

Witnesses

Inventor
ADOLF H. SCHAFFERT
By
Attorneys

A. H. SCHAFFERT.
ADJUSTABLE UNIT SHELVING.
APPLICATION FILED JULY 10, 1914.

1,126,094.

Patented Jan. 26, 1915.
6 SHEETS—SHEET 4.

Witnesses:

Inventor
ADOLF H. SCHAFFERT.

Attorneys

A. H. SCHAFFERT.
ADJUSTABLE UNIT SHELVING.
APPLICATION FILED JULY 10, 1914.

1,126,094.

Patented Jan. 26, 1915.
6 SHEETS—SHEET 5.

Witnesses

Inventor
ADOLF H. SCHAFFERT
By
Attorneys

UNITED STATES PATENT OFFICE.

ADOLF H. SCHAFFERT, OF YOUNGSTOWN, OHIO, ASSIGNOR TO THE GENERAL FIRE-PROOFING COMPANY, OF YOUNGSTOWN, OHIO, A CORPORATION OF OHIO.

ADJUSTABLE UNIT-SHELVING.

1,126,094.  Specification of Letters Patent.  Patented Jan. 26, 1915.

Application filed July 10, 1914. Serial No. 850,242.

*To all whom it may concern:*

Be it known that I, ADOLF H. SCHAFFERT, a citizen of the United States, residing at Youngstown, in the county of Mahoning and State of Ohio, have invented certain new and useful Improvements in Adjustable Unit-Shelving, of which the following is a specification.

This invention relates to metallic furniture of the type designed to meet fireproofing and sanitary conditions, and has particular reference to a new and useful construction of unit metal shelving.

To this end, the primary object of the invention is to provide a construction of all-metal unit shelving wherein the various members may be readily assembled or taken apart, and which are so interlocked and interfitted that a strong and rigid structure is produced capable of sustaining, without strain or distortion, a maximum shelf load or weight.

In this connection, a special feature of the invention is that each member of the shelving units is so constructed and arranged as to contribute to the strength and rigidity of the structure.

Another object of the invention is to provide a shelving construction admitting of considerable latitude in the use or omission of different members of the structure, according as it may be desired to set up plain shelving, inclosed shelving, or semi-inclosed shelving, which various forms may be easily utilized at the option of the user.

Also, it is the purpose of the invention to provide a sectional construction of shelving wherein there is a wide range of adjustability, thereby permitting the shelving to be arranged at different elevations with any desired spacing between the shelf plates or shelves proper.

As a general object, the invention contemplates a sectional metal shelving construction possessing special utility as a substitute for wooden shelving in offices and other locations requiring an economical shelving occupying a minimum space, while at the same time possessing the desirable characteristics of extensibility and adjustability, as well as being entirely fireproof and readily accessible to cleaning.

Though susceptible of structural modification without departing from the general plan and purposes of the invention, a preferred and practical embodiment thereof is shown in the accompanying drawings, in which—

Like reference characters designate corresponding parts in the several figures of the drawings.

The improved shelving embodies in its organization any desired number of units with any desired or required spacing between the shelves proper thereof, thereby admitting of setting up the shelving to have any required length, or height. Accordingly, in order to construct a shelving of any prescribed length or height, it is simply necessary to multiply the units longitudinally and vertically of the structure to meet the requirements, so that regardless of the extent of the shelving being constructed in any location, the individual units of shelving have the same construction and method of assembly throughout. Therefore, a specific description of one of the units of shelving will suffice for the others in the same structure.

Figure 1:
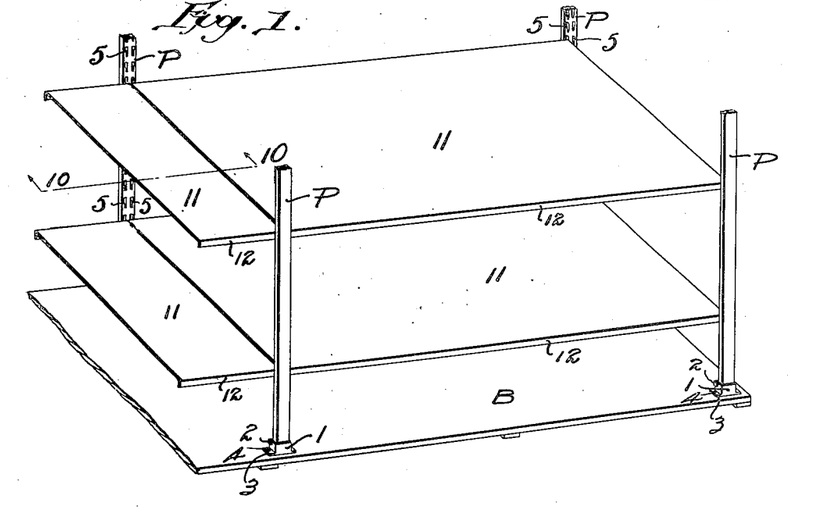
Figure 1 is a perspective view illustrating plain uninclosed metal shelving constructed and set up in accordance with the present invention.
Figure 2:
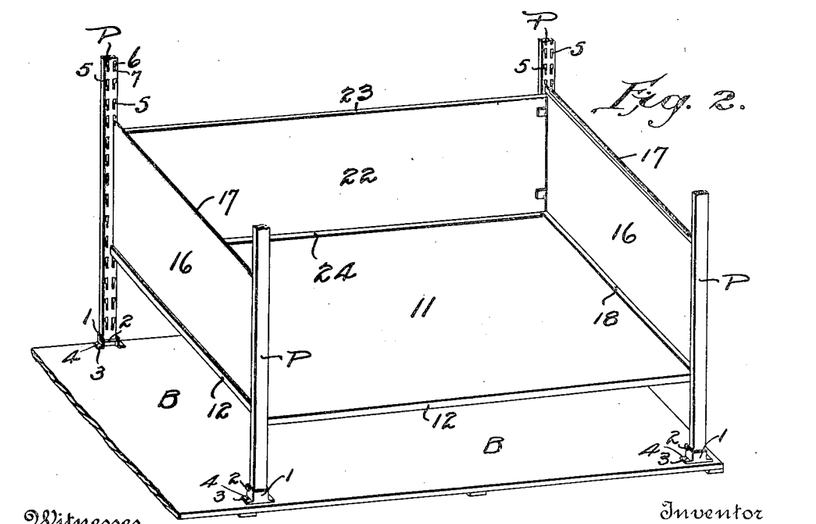
Fig. 2 is a perspective view of one unit of the metal shelving illustrating the several members thereof arranged to provide a semi or partly inclosed shelf.
Figure 3:
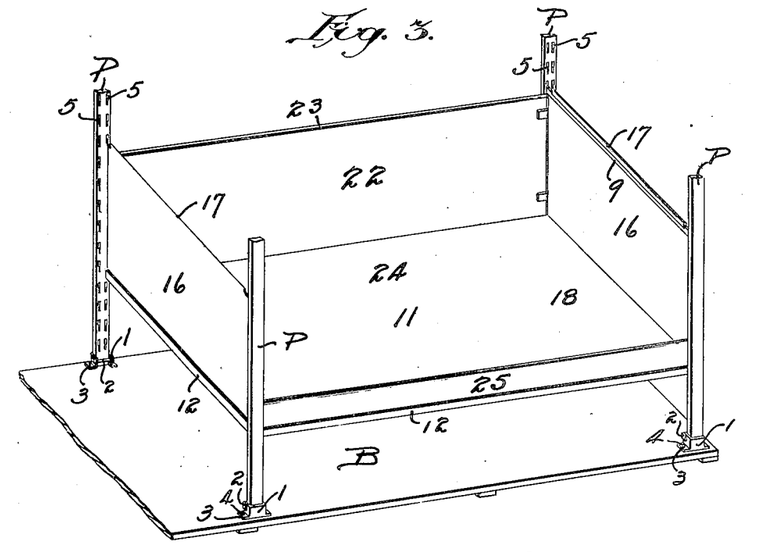
Fig. 3 is a view similar to Fig. 2 showing the members arranged to provide an inclosed shelf, that is one including a back, ends or sides, as well as a front plate or guard.

Referring to the embodiment of the invention illustrated in the drawings, it will be observed by reference to Figs. 1, 2, and 3 of the drawings that the improved shelving includes what may be termed a skeleton framework, primarily made up of a plurality of pairs of transversely opposite frame posts. These posts are designated generally by the reference letter P, and each of the same is intended to be securely held at its lower end on a base or floor B by means of a metal socket 1 which receives the lower end of the post and is securely clamped thereon by means of a clamping bolt 2 connecting opposite side walls of the socket. The latter is also preferably flanged as at 3 to receive the fastening screws 4 which secure the socket to the base or floor B.

Figure 11:
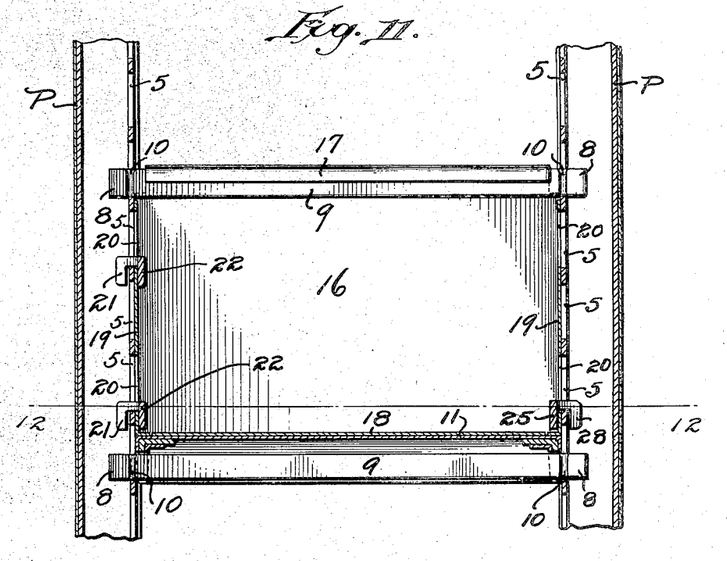
Fig. 11 is a vertical sectional view through one pair of the frame posts, at the inner side of one of the end plates of the unit of shelving shown in Fig. 3 of the drawings, the exact line of section being indicated by the line 11—11 of Fig. 10.
Figure 12:
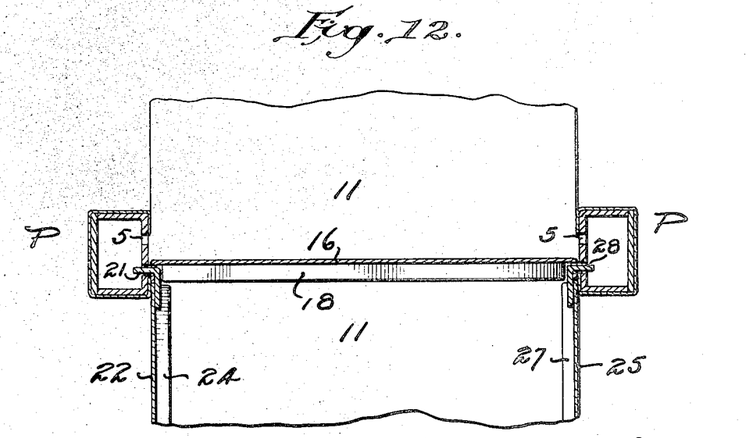
Fig. 12 is a horizontal sectional view on the line 12—12 of Fig. 11.
Figure 13:
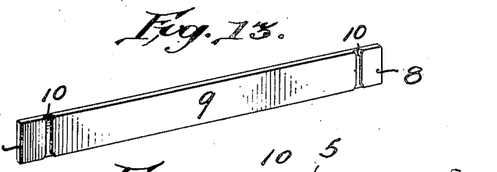
Fig. 13 is a detail in perspective of one of the supporting tie bars which connects the posts of each pair, and upon which is supported the shelf plates or bottom members of each unit.

As indicated, the frame posts P are arranged in pairs, with those of each pair occupying transversely opposite positions, and as shown, the said posts are intended to be made of sheet metal or metal plates of any required length and bent or shaped to a cross sectionally rectangular form producing hollow posts of the general character best seen in Figs. 11 and 12 of the drawings. A distinctive characteristic of these vertically arranged hollow frame posts P is the provision therein of two vertical rows of mortise slots 5 cut through the inner sides or walls thereof. The two rows of the said slots 5 lie in parallel vertical planes, and there are the same number and spacing of slots in each row. Furthermore, all of the mortise slots 5 are duplicates in construction, that is to say, each of the same is of a substantially keyhole form of slot having enlarged and narrowed portions 6 and 7 respectively which coöperate with the terminal tenon ends 8 of the supporting tie bars 9.

Figure 14:
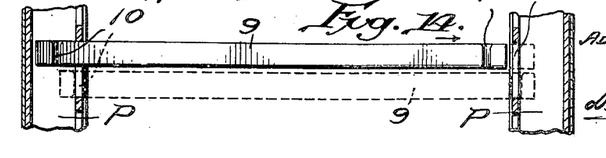
Fig. 14 is a detail sectional view illustrating by full and dotted lines the manner of engaging and disengaging one of the bars between a pair of opposite frame posts.

The supporting tie bars 9 are duplicates in construction and freely interchangeable, each of the same consisting of a flat metal bar having a straight form throughout and provided near its ends, and in one face thereof, with the transverse holding grooves 10 which are designed to slidably interlock with edges of the narrowed portions 7 of the mortise slots 5. Referring more particularly to the mounting of the individual supporting tie bars 9, it will of course be understood that these bars are arranged at any desired elevation according to the position or elevation of the unit of shelving of which the bar is to form a part. To place one of the tie bars in position between a pair of the frame posts, the bar is held in an edgewise position, that is the position shown in Fig. 14 of the drawings. One end thereof is then inserted through the enlarged portions 6 of the mortise slot 5 in one of the posts and moved inward within the post to permit the opposite end of the bar to clear the opposite post sufficiently to bring such opposite end of the bar in alinement with the enlarged portion 6 of the mortise slot of the opposite post in the same horizontal plane. Then the bar may be moved longitudinally in the direction of the arrow indicated in Fig. 14 to bring said opposite end of the bar into the enlarged portion of the said opposite slot. Now the bar is in a position to be moved downwardly into the narrowed portions 7 of the directly opposite slots, so that the holding grooves 10 at the ends of the bar become engaged with the edges of the slots and thereby interlock the bars to the opposite posts as plainly shown not only in Fig. 14 of the drawings, but also in Fig. 11.

Figure 4:
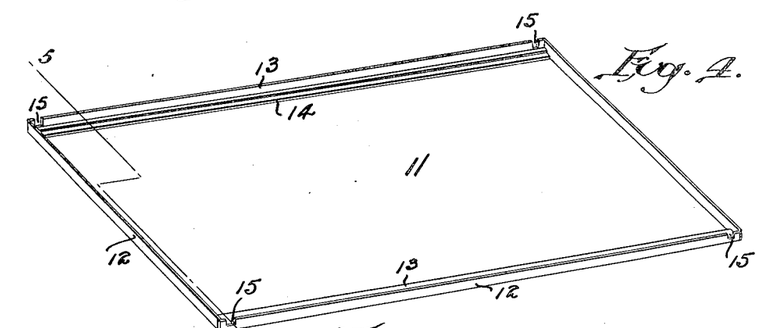
Fig. 4 is a bottom perspective view of one of the shelf plates or shelves proper, constituting the bottom member of each unit of the shelving.
Figure 5:
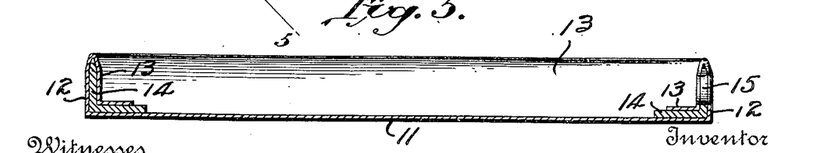
Fig. 5 is a cross sectional view of a single shelf plate on the line of section 5—5 of Fig. 4, illustrating the folded flange formation at the longitudinal edges of the plate to receive and hold the reinforcing angle bars.
Figure 6:
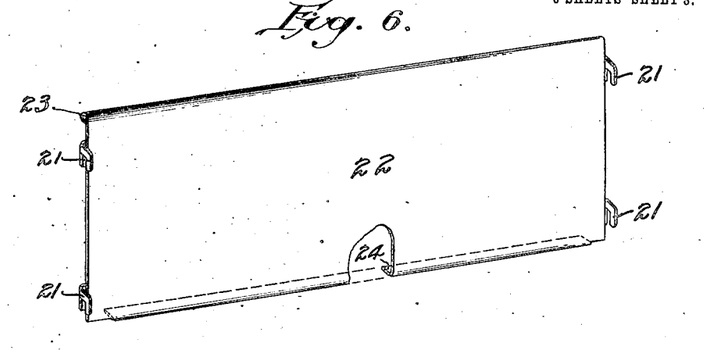
Fig. 6 is a perspective view, partly in section, of the back plate or member of each unit of the shelving.
Figure 7:
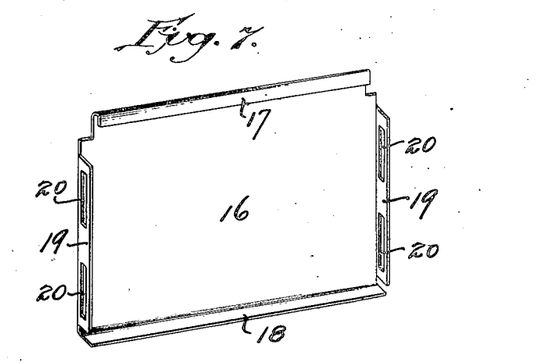
Fig. 7 is an inner perspective view of one of the end plates for each unit of the shelving.

To construct a complete unit of shelving with all of the various members employed requires two pairs of the frame posts, or a set of four of such posts, together with a lower pair of the tie bars for the shelf plate, and an upper pair of the tie bars for certain members of the unit when the shelving is to be inclosed or partly inclosed. The shelf plate or bottom member of the unit is adapted to be arranged in a horizontal position between the two pairs of frame posts, as shown in Fig. 1 of the drawings, and is supported entirely by the lower pair of the tie bars. This shelf plate is preferably constructed of a single piece of sheet metal of any desired thickness or weight, but by reason of its special reinforcement may be made of comparatively light material and at the same time be capable of sustaining a heavy load or weight. In form, the shelf plate designated by the reference number 11 is rectangular, and the same is provided at its marginal edges with the side and end downturned stiffening flanges 12 and 13 respectively. These flanges are bent from the body of the plate at its edges and project to one side thereof in order to leave a perfectly flat and unobstructed top surface, and while the end stiffening flanges 13 are formed by a simple bend of the end edges of the plate, the longitudinal side flanges 12 are folded inwardly, and rebent to provide casings 13 which snugly receive and hold stout reinforcing angle bars 14. The vertical flange members of the said angle bars are disposed at right angles to the flat plane of the plate, while the horizontal flange members of the angle bars are parallel with the flat plane of the plate and underlie the side edge portions of the latter, thereby giving the same great strength and rigidity along its longitudinal edges. Furthermore, it is to be observed by reference to Figs. 4 and 5 of the drawings that the reinforced side flanges of the shelf plate 11 are provided contiguous to the ends thereof with relatively deep keeper notches 15 which penetrate the vertical flange members of the angle bars 13 so that the latter constitute the sustaining or supporting members for the sheet metal body of the shelf plate, it being noted that when the shelf plate of the unit is placed in position, the end pairs of keeper notches 15 are brought into interlocking engagement with the opposite tie bars of the lower pair thereof. In other words, the notched angle bars 14 are interlocked at their ends with the opposite supporting tie bars 9 and in turn support and carry the metal body of the plate.

Figure 9:
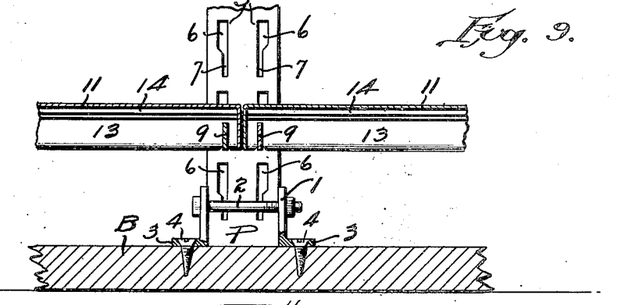
Fig. 9 is an enlarged detail sectional view showing the alined relation of the shelf plates or shelves proper of adjoining units, and the supporting engagement between the shelf plates and supporting tie bars extending between a pair of oppositely arranged frame posts.
Figure 10:
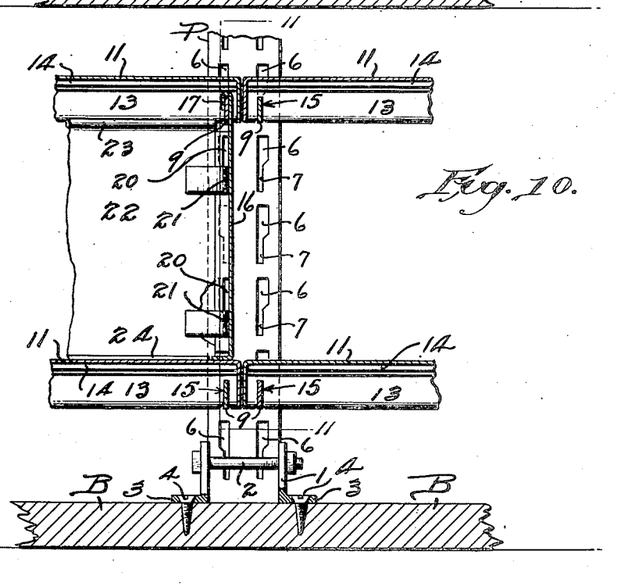
Fig. 10 is a vertical fragmentary longitudinal sectional view on the line of section 10—10 of Fig. 1, the view including the bottom members or shelf plates of four units, and also including portions of the back plate and one end plate of one of these units, showing the interlocked relation of the various adjoining parts.

For the uninclosed shelving, it is simply necessary to arrange the supporting tie bars 9 and the shelf plates or shelves proper 11 in the manner described, and plainly illustrated in Figs. 1 and 9 of the drawings, and in that connection it may be further observed, as shown in both Figs. 9 and 10 of the drawings, that adjoining shelf plates in the same horizontal plane are interlocked with a pair of the supporting tie bars 9 respectively mounted in slots of the same pair of frame posts. As thus mounted, it will be seen that adjoining shelf plates are disposed in such close relation and so interlocked with the same frame posts, through the supporting tie bars therefor, that a substantially continuous shelving is provided, while at the same time a very rigid and thoroughly braced structure is obtained.

To provide for setting up an inclosed or partly inclosed form of shelving according to the present invention, each unit of the shelving includes, as a part thereof, the oppositely arranged sheet metal end plates 16 constituting the upright end walls of the unit. Each of these end plates is of a substantially rectangular form being of a length substantially equaling the distance between the opposite frame posts of each pair thereof, and of a width substantially equaling the distance between upper and lower supporting tie bars belonging to each unit of the shelving. Structurally, each of the end plates 16 consists of a single piece of sheet metal provided at its upper edge with a longitudinally arranged folded hanger flange 17 bent to one side of the vertical plane of the body of the plate and adapted to be detachably hooked over one of the upper tie bars of the unit. At its corresponding lower edge, each end plate 16 is provided with a laterally extending foot flange 18 disposed at right angles to the body of the plate and adapted to be seated on the upper side of the shelf plate 11 contiguous to one end thereof, the upright position of the end plate 16 therefore being substantially in the vertical plane of upper and lower ones of the supporting tie bars 9. This may be plainly seen from Figs. 10 and 11 of the drawings, and it will further be noted that a distinctive feature in the construction and function of each of the end plates 16 resides in the provision of said plate, at its vertical end edges, with laterally projecting and right angularly disposed coupling flanges 19 which are adapted to lie parallel with and close to the inner faces of the opposite frame posts between which the end plate is arranged, so that vertically arranged keeper slots 20 in the said flanges 19 will communicate and register with certain of the mortise slots 5 in the frame posts. These registering slots are adapted to receive therein locking hooks 21 projected laterally from a back plate or member 22, at one end of the latter.

The back plate or member 22 is preferably made of a single blank of sheet metal, of rectangular form, and the end locking hooks 21 thereof are welded or otherwise rigidly secured thereto, and project to one side of the vertical plane thereof, so that they may be passed through the keeper slots 20 of the back coupling flange 19 of the end plate 16 and engage with certain of the mortise slots 5 in the same manner that the tenon ends of the tie bars 9 are engaged with such slots. That is to say, after the end plates 16 are placed in position between the opposite frame posts, the back plate 22 is carried to its position at the back of the shelf plate and the locking hooks 21 thereof first inserted through the enlarged portions 6 of certain of the slots 5, and then forced downward into the narrowed portion 7 of such slot, with the result of carrying the hooks 21 over the bottom edges of the mortise slots 5, and hence over the bottom edges of the keeper slots 20 in the back coupling flange of the end plate, thereby holding the frame posts, the end plates, and the back plate in firm interlocking and interfitting relation. This is plainly shown in Figs. 10 and 11 of the drawings.

To obtain a proper stiffening and reinforcement of the back plate 22, the same is preferably formed at its upper longitudinal edge with a rolled reinforcing bead 23 and at its lower edge with a laterally extending and right angularly disposed reinforced flange 24 which overlies and rests on the shelf plate 11 contiguous to the rear or back edge thereof.

Figure 8:
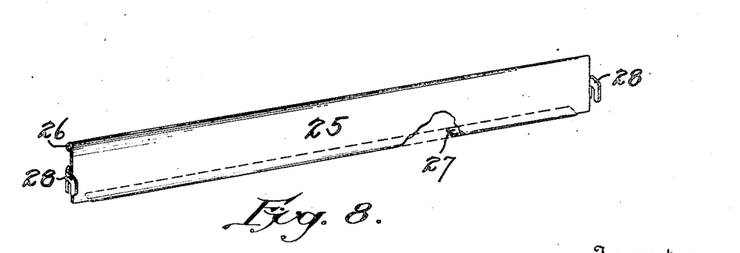
Fig. 8 is a perspective view partly in section of the front guard rail which is employed to fully inclose the supporting surface of the shelf plate or shelf proper, when such an arrangement is desired.

Should it be desired to partly inclose the front of each unit of shelving, this may be accomplished by utilizing the front guard rail 25, illustrated in detail in Fig. 8 of the drawings. This front guard rail is substantially a duplicate in construction of the back plate 22, though much narrower in width. That is to say, the front guard rail 25 is formed at its top edge with a reinforce bead 26, at its bottom edge with a laterally extending reinforce flange 27, and at its opposite ends with laterally projecting downturned locking hooks 28. The said guard rail 25 is adapted to be placed in upright position longitudinally of the shelf plate at or contiguous to the front edge of the latter, and the terminal locking hooks 28 are adapted to be passed through keeper slots 20 in the front coupling flanges 19 of the end plate 16 and engaged with the adjoining and communicating mortise slots 5 of the frame posts in the same manner as the hooks 21 of the back plate are engaged with the posts and the back coupling flanges of the end plate, as illustrated in Fig. 11 of the drawings. The disengagement of the locking hooks of the front and back plates 25 and 22 may be readily accomplished by lifting such hooks out of the narrowed portions 7 of the mortise slots into the enlarged portions 6 of such slots, whereupon they may be readily withdrawn from the latter, and thus free the end plates so that such plates may be lifted off the upper tie bars 9 upon which they are hung. Likewise, after the shelf-inclosing plates 16, 22, and 25 are removed, the shelf plate can be removed by simply lifting the same off of the tie bars engaged therewith. It will thus be seen that the improved shelving can be assembled and taken apart with great facility while also having the various members thereof so constructed and arranged that there is a mutual interlocking and interfitting thereof throughout the entire shelving, resulting in the production of a shelving having great strength and rigidity, and presenting many advantages over the ordinary wooden shelving without material, if any, increase in cost thereover.

A great variety of combinations may be effected in assembling the various members of the shelving and still retain the structural and functional characteristics of the invention. This is of considerable practical importance, especially when different combinations of shelves of different widths are desired in one stack, and for the purpose of illustrating this adaptability of the shelving, reference is made to the illustrative group of Figs. 15, 16, and 17 of the drawings. For instance, as clearly shown in Figs. 15 and 16 of the drawings, it is oftentimes desirable to provide a stack of unit shelving wherein the lower shelves, say up to a height of thirty three inches from the floor, are wider than the shelves above this point. Such a stack may be formed by utilizing a lower series of relatively short front frame posts P' of approximately the height of the lower tiers of wide shelving, and a series of relatively long rear frame posts P² extending the full height of the entire stack of shelving and arranged in opposite relation to the front posts in the manner hereinbefore explained. By reason of employing these relatively short and long front and rear frame posts P' and P², the same provide, in combination with the supporting tie bars, means for holding in position lower tiers of wide shelf plates 11ª, for instance eighteen inches wide, and the uppermost of these wide shelves can be utilized as a ledge plate or supporting base for the upper series of relatively short front frame posts P³. These upper front frame posts P³ are arranged in opposite relation with the full height rear frame posts P² and coöperate therewith, in combination with supporting tie bars to support upper tiers of relatively narrow shelves or shelf plates 11ᵇ, which for instance may be twelve inches in width. In this assembly, the upper series of short frame posts P³ merely set upon the top of the uppermost wide shelf 11ª, although a foot piece could be used on the said posts P³, if desired, as will be readily understood.

Figure 17:
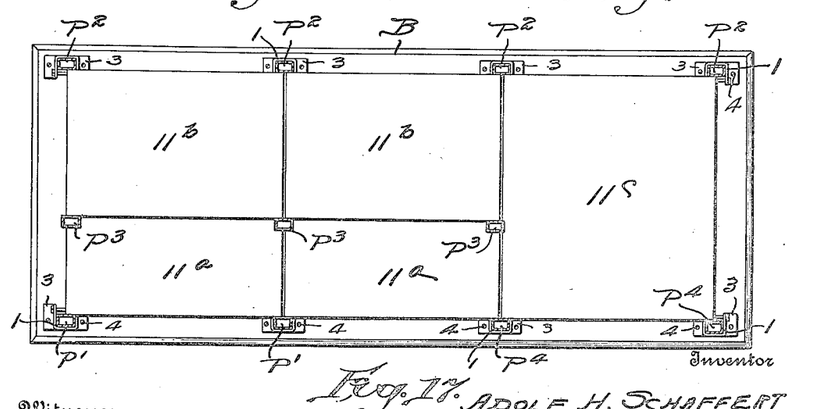
Fig. 17 is a sectional plan view illustrating another design of shelving embodying the present invention and showing a still further arrangement of a variety of different widths of shelves or shelf plates in the same stack.

A further amplification of the different modifications that may be resorted to is illustrated in Fig. 17 of the drawings. This figure of the drawings may be regarded as a cross sectional view on the line 17—17 of Fig. 15 of the drawings to the extent of the wide and narrow shelving shown in that figure, and to a stack of that character there may be added at one or both ends, a tier of the eighteen inch shelves or shelf plates 11c extending the full height of the stack. In this arrangement, it is preferable and desirable to employ full height frame posts P⁴ at the front corners of the shelving 11c in opposite relation to the full height rear frame posts P² at the rear corners of this shelving.

Figure 15:
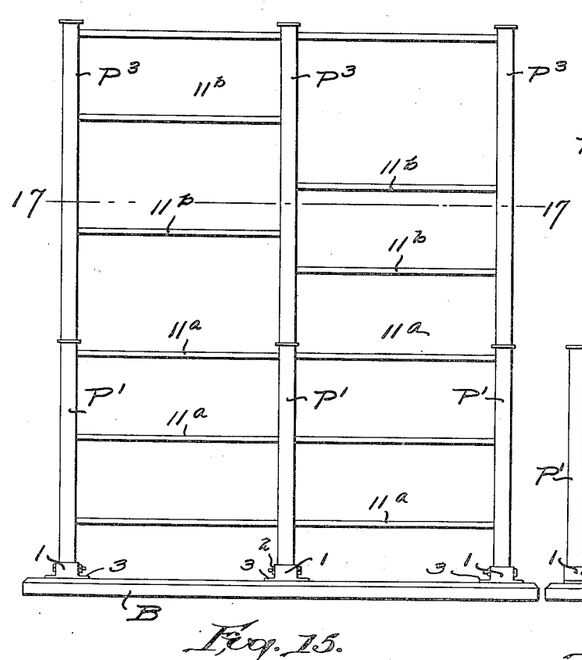
Fig. 15 is a front elevation of a stack of unit shelving embodying the present invention, and illustrating its adaptability to the formation of shelving of different widths in one stack.
Figure 16:
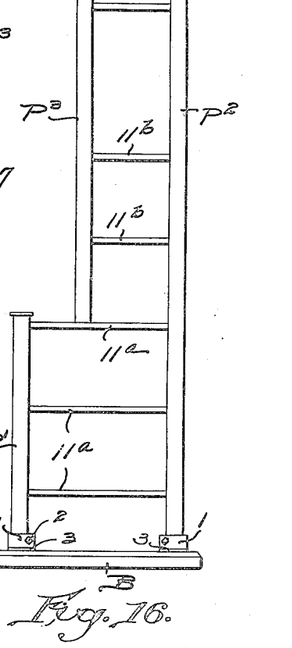
Fig. 16 is an end view of the stack of shelving illustrated in Fig. 15.

It will be understood that the illustration of Figs. 15, 16 and 17 are merely intended to show the different forms and combinations of shelving that may be provided, and that in all of these forms and combinations, the same structural features are employed for supporting the shelves as herein described in connection with the other figures of the drawings.

While the preferable embodiments of the invention have been described, it will be understood that changes in the form, proportion, and minor details of construction may be resorted to without departing from the spirit or sacrificing any of the advantages of the invention.

What I claim is:

1. Unit shelving including, in combination, a plurality of transversely opposite frame posts, supporting tie bars interlocked with opposite posts, a shelf plate separately engaged with opposite tie bars, upright end plates arranged over the end portions of the shelf plate, and an upright back plate having a locking engagement with the end plates and with certain of the posts.

2. Unit shelving including, in combination, a plurality of frame posts, supporting tie bars connecting opposite posts, a shelf plate supported by opposite tie bars, upright end plates arranged over the shelf plate, an upright back plate, and means for separably interlocking together the back plate, the end plates, and certain of the posts.

3. Unit shelving including, in combination, a plurality of frame posts, supporting tie bars connecting opposite posts, a shelf plate supported by opposite tie bars, upright end plates, and a back plate having hook members which engage with both the end plates and certain of the posts.

4. Unit shelving including, in combination, a plurality of frame posts, supporting tie bars connecting opposite posts, a shelf plate supported by opposite tie bars, upright end plates having coupling flanges, and a back plate having locking members engaging said coupling flanges and certain of the posts.

5. Unit shelving including, in combination, a plurality of frame posts having rows of slots therein, supporting tie bars connecting opposite posts, a shelf plate supported by opposite tie bars, upright end plates having coupling flanges provided with slots adapted to register with slots of the frame posts, and a back plate having hook members adapted to interlock with the registering slots.

6. Unit shelving including, in combination, a plurality of frame posts, upper and lower sets of supporting tie bars connecting opposite posts, a shelf plate supported by a lower set or pair of the tie bars, upright end plates provided at their upper edges with hanger flanges separably engaging said upper supporting tie bars, and a back plate having locking members engaging back portions of the end plates and certain of the posts.

7. Unit shelving including, in combination, a plurality of frame posts having rows of slots therein, upper and lower sets of supporting tie bars connecting opposite posts, a shelf plate supported by a lower set or pair of the tie bars, upright end plates having coupling flanges lying at the inner sides of the posts and provided with slots adapted to register with slots of the posts, said end plates being further provided with hanger flanges separably engaging said upper supporting tie bars, and a back plate provided with terminal locking hooks adapted to interlock with the registering slots.

8. Unit shelving including, in combination, a plurality of frame posts, supporting tie bars connecting opposite posts, a shelf plate supported by opposite tie bars, upright end plates, a back plate having locking members engaging with both end plates and certain of the plates, and a front rail guard having locking members engaging with both end plates and certain of the posts.

9. Unit shelving including, in combination, a plurality of frame posts having rows of slots therein, supporting tie bars connecting opposite posts, a shelf plate supported by opposite tie bars, upright end plates having coupling flanges provided with slots adapted to register with slots of the frame post, a back plate having hook members adapted to interlock with registering slots of the back coupling flanges and certain of the posts, and a front rail guard having hook members adapted to interlock with registering slots of the front coupling flanges and certain of the posts.

In testimony whereof I hereunto affix my signature in the presence of two witnesses.

ADOLF H. SCHAFFERT.

Witnesses:
A. P. WHITE,
H. E. WHITE.